US012277132B2

(12) United States Patent
Kannan et al.

(10) Patent No.: US 12,277,132 B2
(45) **Date of Patent: *Apr. 15, 2025**

(54) SIMILARITY ANALYSES IN ANALYTICS WORKFLOWS

(71) Applicant: HEWLETT PACKARD ENTERPRISE DEVELOPMENT LP, Houston, TX (US)

(72) Inventors: Kalapriya Kannan, Bangalore (IN); Suparna Bhattacharya, Bangalore (IN); Douglas L Voigt, Boise, ID (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/530,866

(22) Filed: Nov. 19, 2021

(65) Prior Publication Data

US 2022/0075794 A1 Mar. 10, 2022

Related U.S. Application Data

(63) Continuation of application No. 16/305,004, filed as application No. PCT/US2016/034611 on May 27, 2016, now Pat. No. 11,204,935.

(51) Int. Cl.

| | |
|---|---|
| ***G06F 16/25*** | (2019.01) |
| ***G06F 11/30*** | (2006.01) |
| ***G06F 11/34*** | (2006.01) |

(52) U.S. Cl.

CPC ............ *G06F 16/254* (2019.01); *G06F 11/30* (2013.01); *G06F 11/302* (2013.01); *G06F 11/3476* (2013.01)

(58) Field of Classification Search

CPC ...... G06F 16/254; G06F 11/30; G06F 11/302; G06F 11/3476

See application file for complete search history.

(56) References Cited

U.S. PATENT DOCUMENTS 7,966,327 B2 * 6/2011 Li ......................... G06F 16/583 707/737
8,583,467 B1 * 11/2013 Morris ............ G06Q 10/06316 705/7.22

(Continued)

FOREIGN PATENT DOCUMENTS

EP 2568434 A1 3/2013

OTHER PUBLICATIONS

B, T. et al., "Coupling Based BigData Analysis—Reusability of Datasets," (Research Paper), Apr.-May 2014, 4 Pgs.

(Continued)

*Primary Examiner* — Pierre M Vital
*Assistant Examiner* — Zuheir A Mheir
(74) *Attorney, Agent, or Firm* — Hewlett Packard Enterprise Patent Department

(57) ABSTRACT

Examples include bypassing a portion of an analytics workflow. In some examples, execution of an analytics workflow may be monitored upon receipt of a raw data and the execution may be interrupted at an optimal bypass stage to obtain insights data from the raw data. A similarity analysis may be performed to compare the insights data to a stored insights data in an insights data repository. Based, at least in part, on a determination of similarity, a bypass operation may be performed to bypass a remainder of the analytics workflow.

20 Claims, 9 Drawing Sheets

100
DEVICE
110 PROCESSING RESOURCE
104 INSIGHTS DATA REPOSITORY
120 MACHINE-READABLE STORAGE MEDIUM
130 DETERMINE AN OPTIMAL BYPASS STAGE OF ANALYTICS WORKFLOW
140 MONITOR EXECUTION OF ANALYTICS WORKFLOW UPON RECEIPT OF RAW DATA
150 INTERRUPT EXECUTION OF ANALYTICS WORKFLOW AT OPTIMAL BYPASS STAGE AND OBTAIN INSIGHTS DATA
160 PERFORM SIMILARITY ANALYSIS TO COMPARE INSIGHTS DATA TO STORED INSIGHTS DATA IN INSIGHTS DATA REPOSITORY
170 BASED ON DETERMINATION OF SIMILARITY, PERFORM BYPASS OPERATION TO BYPASS REMAINDER OF ANALYTICS WORKFLOW

(56) References Cited

U.S. PATENT DOCUMENTS

| | | | | |
|---|---|---|---|---|
| 9,262,493 | B1 * | 2/2016 | Dietrich | G06F 16/254 |
| 9,684,866 | B1 * | 6/2017 | Todd, Jr. | G06F 9/5072 |
| 10,275,234 | B2 * | 4/2019 | Belyy | G06F 11/3624 |
| 10,402,414 | B2 * | 9/2019 | Kutzkov | G06F 16/2457 |
| 2002/0161825 | A1 * | 10/2002 | Kogoh | G06Q 10/10 709/205 |
| 2006/0259451 | A1 * | 11/2006 | Gibbons | G06Q 10/06 |
| 2007/0073625 | A1 * | 3/2007 | Shelton | G06Q 90/00 705/59 |
| 2008/0016554 | A1 * | 1/2008 | Rits | G06Q 10/06 726/4 |
| 2009/0171890 | A1 * | 7/2009 | Johnson | G06F 16/24568 |
| 2009/0171990 | A1 * | 7/2009 | Naef, III | G06Q 10/06 |
| 2009/0248560 | A1 * | 10/2009 | Recce | G06Q 99/00 705/500 |
| 2012/0154405 | A1 * | 6/2012 | Baumgartner | G06F 16/2433 345/440 |
| 2012/0215582 | A1 * | 8/2012 | Petri | G06Q 10/0633 705/7.27 |
| 2016/0203279 | A1 * | 7/2016 | Srinivas | G16H 10/60 705/2 |
| 2017/0104627 | A1 * | 4/2017 | Bender | H04L 47/765 |
| 2017/0364390 | A1 * | 12/2017 | Bland | G06F 8/60 |
| 2017/0371541 | A1 * | 12/2017 | Dhuse | G06F 3/0659 |
| 2017/0371940 | A1 * | 12/2017 | Chintakayala | G06F 16/254 |

OTHER PUBLICATIONS

Lei, C. et al., “Redoop Infrastructure for Recurring Big Data Queries,” (Research Paper), Sep. 2014, 4 Pgs.

Shivarkar, S. A., “Speed-up Extension to Hadoop System,” (Research Paper), Jun. 2014, 4 Pgs.

* cited by examiner

SIMILARITY ANALYSES IN ANALYTICS WORKFLOWS

BACKGROUND

Systems and applications may increase data collection rates to more effectively support a wide range of tasks. The large amounts of collected data, sometimes measuring in the terabytes, petabytes, or more, may be referred to as big data. In some examples, the collected, raw data may be unstructured and difficult to utilize. Accordingly, extract, transform, and load (ETL) operations may be performed on the raw data as part of an analytics workflow to maximize the benefits of the collected data ETL operations, however, may be computationally intensive, especially when performed over large amounts of data, may involve numerous input/output (I/O) operations, and may add latency.

BRIEF DESCRIPTION OF THE DRAWINGS

The following detailed desorption references the drawings, wherein.

DETAILED DESCRIPTION

Figure 1:
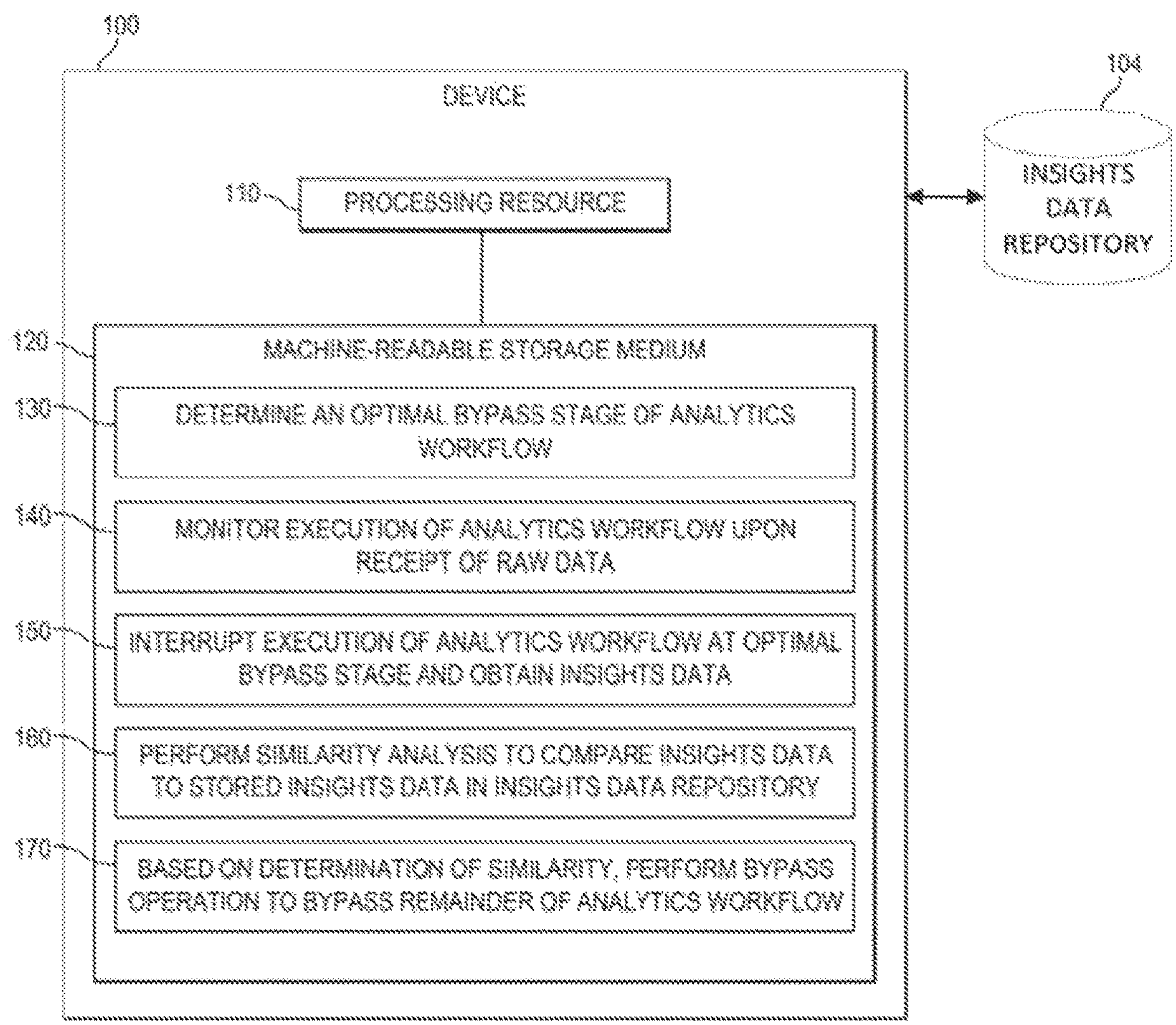
FIG. 1 is a block diagram of an example device having a processing resource and a machine-readable storage medium including instructions to determine an optimal bypass stage, perform a similarity analysis, and based on the analysis, bypass a remainder of the analytics workflow.

Many systems and applications may gather large amounts of data in real-time, on a streaming basis, or periodically In some examples, individual data points may be largely similar, whereas in other examples, the individual data points may vary widely. For instance, systems and applications for weather forecasting or web traffic prediction may gather large amounts of similar data. The collection of large amounts of data may allow for complex inferences and correlations to be deduced from the gathered data. The collected data may, in some examples be referred to as raw data. As used herein, raw data may refer to data that has not been processed for use. To more effectively, search, organize, and use the raw data, an analytics workflow may process the raw data. As used herein, an analytics workflow may refer to a set of operations to process raw data for use. In some examples, the analytics workflow may include ETL operations. The analytics workflow may also include analytics models to mine, filter, organize, and exploit the raw data.

ETL operations may, in some instances, act as a bottleneck within a system or application. In particular, ETL operations may involve performing multiple input/output (I/O) operations to organize or move data. ETL operations may also involve large amounts of processing power. In addition, a system or application may need access to large amounts of storage for storing the raw data, for storing any intermediate data as it undergoes ETL operations as part of the analytics workflow, and for storing the analyzed date. In some examples, ETL operations may take an hour to several hours to execute.

In some examples, data placement and workflow orchestration techniques have been used to minimize unnecessary data movement (thereby reducing I/O operations) and to ensure operations are executed in an efficient order. However, data placement and workflow orchestration may be undesirable and fail to reduce processing power, I/O operations, and latency to a suitable extent. In other examples, data reduction techniques have been performed on the raw data such that the ETL operations of the analytics workflow are performed on a reduced, representative sample of data rather than the entire data set But, executing an analytics workflow on a severely reduced sample of data, rather than the entire data set, may be undesirable in certain instances as it may result in a loss of relevant date. In yet other examples, the results of analytical models on data sets may be cached or stored and reused when a task involves executing the analytical models on the same or overlapping data sets Exploiting similarities after completion of an analytics workflow, however, may still involve an undesirable usage of processing power and I/O operations as well as undesirable latency.

Examples described herein may accelerate an analytics workflow and may reduce computational intensity, overall latency, the number of I/O operations used, aid foe amount of storage space used, especially in systems and applications involving large amounts of similar data. Moreover, examples described herein may recognize data at an optimal bypass stage as being similar despite the originally ingested raw date being dissimilar. Some examples described herein may determine an optimal stage for bypassing an analytics workflow. And based (at least in part) on a similarity analysis that determines a similarity between insights data at the optimal bypass stage and a stored insights data, a bypass operation may be performed to bypass a portion of the analytics workflow. In addition, in some examples, overall storage needs may be reduced as some raw data, intermediate data, and output date may not be stored or may be stored in slower or less expensive storage options.

In some examples described herein, a processing resource of a device may execute instructions on a machine-readable storage medium to determine an optimal bypass stage of an analytics workflow. The processing resource may further execute instructions to monitor execution of the analytics workflow upon receipt of a raw date, interrupt the execution of the analytics workflow at the optimal bypass stage, and obtain insights data from the raw data. A similarity analysis to compare the insights data to a stored insights data in an insights date repository may be performed. Based (at least in part) on a determination of similarity, the processing resource may execute instructions to perform a bypass operation to bypass a remainder of the analytics workflow. In examples described herein, a determination, action, etc., that is said to be based on a given condition may be based on that condition alone or based on that condition and other condition(s).

In some examples described herein, a machine-readable storage medium may be encoded with instructions to monitor execution of an analytics workflow upon receipt of raw data. The machine-readable storage medium may further comprise instructions to interrupt the execution of the analytics workflow at an optimal bypass stage, obtain insights data from the raw data, and perform a similarity analysis to compare the insights data to a stored insights data in an insights data repository. Based (at least in part) on a determination of similarity, the machine-readable storage medium may include instructions to perform a bypass operation to bypass a remainder of the analytics workflow. Based (at least in part) on a determination of dissimilarity, the machine-readable storage medium may include instructions to store the insights data as stored insights data in the insights data repository and to execute the remainder of the analytics workflow to generate analyzed data.

In some examples described herein, a method for an analytics workflow may involve monitoring execution of the analytics workflow upon receipt of raw data, interrupting the execution of the analytics workflow at an optimal bypass stage, and obtaining insights data from the raw data. The method may further involve performing a similarity analysis to compare the insights data to a stored insights data in an insights data repository. Based (at feast in part) on a determination of similarity, a bypass operation may be performed to bypass a remainder of the analytics workflow. Based (at least in part) on a determination of dissimilarity, the insights data may be stored as stored insights data in the insights data repository and a threshold may be identified for the stored insights data. In some examples, based (at least in part) on a determination of dissimilarity, the threshold may be stored with the stored insights data and each stored insights data in the insights data repository may have an associated threshold. The method may further involve executing the remainder of the analytics workflow to generate analyzed data, based (at least in part) on a determination of dissimilarity.

Referring now to the drawings, FIG. 1 is a block diagram of an example device 100 having a processing resource 110 and a machine-readable storage medium 120 that includes instructions that may bypass a portion of an analytics workflow. Device 100 includes a processing resource 110 and may be any networking, computing, or storage device suitable for execution of the functionality described below. As used herein, a device may be a desktop computer, laptop (or notebook) computer, workstation, tablet computer, mobile phone, smart device, switch, router, server, blade enclosure, or any other processing device or equipment including a processing resource. In some examples, device 100 may be a controller node for a storage platform or may be located within a controller node for a storage platform.

As depicted in FIG. 1, device 100 may also include a machine-readable storage medium 120 comprising (e.g., encoded with) instructions 130, 140, 150, 160, and 170 executable by processing resource 110 to implement functionalities described herein in relation to FIG. 1. In some examples, storage medium 120 may include additional instructions. In other examples, the functionalities described herein in relation to instructions 130, 140, 150, 160, 170, and any additional instructions described herein in relation to storage medium 120, may be implemented at least in part in electronic circuitry (e.g., via components comprising any combination of hardware and programming to implement the functionalities described herein).

As used herein, a machine-readable storage medium may be any electronic, magnetic, optimal, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hand drive), a solid state drive, any type of storage disc (e.g., a compact disc, a DVD, etc.), and the like, or a combination thereof. Further, any machine-readable storage medium described herein may be non-transitory.

In examples described herein, a processing resource may include, few example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform toe functionalities described above in relation to instructions 130, 140, 150, 160, and 170. In other examples, the functionalities of any of the instructions of storage medium 120 may be implemented in the form of electronic circuitry, in the form of executable instructions encoded on a machine-readable storage medium, or a combination thereof. In the example of FIG. 1, storage medium 120 may be implemented by one machine-readable storage medium, or multiple machine-readable storage media.

In the example of FIG. 1, instructions 130 may determine an optimal bypass stage of an analytics workflow. As used herein, an analytics workflow may refer to a set of operations to process raw data for use. Raw data, as used in examples herein, may refer to data that has not been processed for use. In some examples, the analytics workflow may include ETL operations. In other examples, the analytics workflow may also include analytical models to mine, filter, organize, and further exploit the raw data. Each ETL operation or a subset of ETL operations may comprise a stage of the analytics workflow.

An optimal bypass stage, as used in examples herein, may refer to a stage of the analyses workflow at which a remainder of the analytics workflow may be suitably bypassed or skipped. As described in more detail below, the optimal bypass stage may be a stage within an analytics workflow at which a similarity analysis Is performed to determine whether data generated at the optimal bypass stage (insights data) is similar to previous data generated at the same stage (stored insights data). In some examples, if there is a similarity, the remainder of the analytics workflow may be bypassed.

In some examples, the optimal bypass stage may be determined by analyzing each stage of the analytics workflow. For instance, the completion time to each stage, the completion time for the remaining stages, the amount of data at each stage, foe processing power used at each stage, the time involved in completing a similarity analysis to determine a similarity or dissimilarity of the data to other data for bypassing foe analytics workflow, as well as other factors may be considered.

In some examples, an optimal bypass stage may be determined by calculating a time to complete a similarity analysis at each stage and comparing it against a time to completion of the analytics workflow at each stage. In other examples, an optimal bypass stage may be determined by the processing power used to complete a similarity analysis at each stage and comparing it against the processing power to complete the analytics workflow from each stage. In yet other examples, an optimal bypass stage may be determined by analyzing the number of I/O operations at each stage or any other suitable metric.

In some examples, the determination of an optimal bypass stage may occur on a periodic basis. In other examples, the determination of an optimal bypass stage may occur once, for instance at start-up or initialization, and may not be repeated. In some such examples, a workflow execution log may track executions of the analytics workflow and foe optimal bypass stage may be determined at a first execution of the analytics workflow. In yet other examples, the determination of an optimal bypass stage may be repeated based on a trigger, for Instance, when the processing power or latency of the analytics workflow has exceeded a certain amount.

Figure 11:
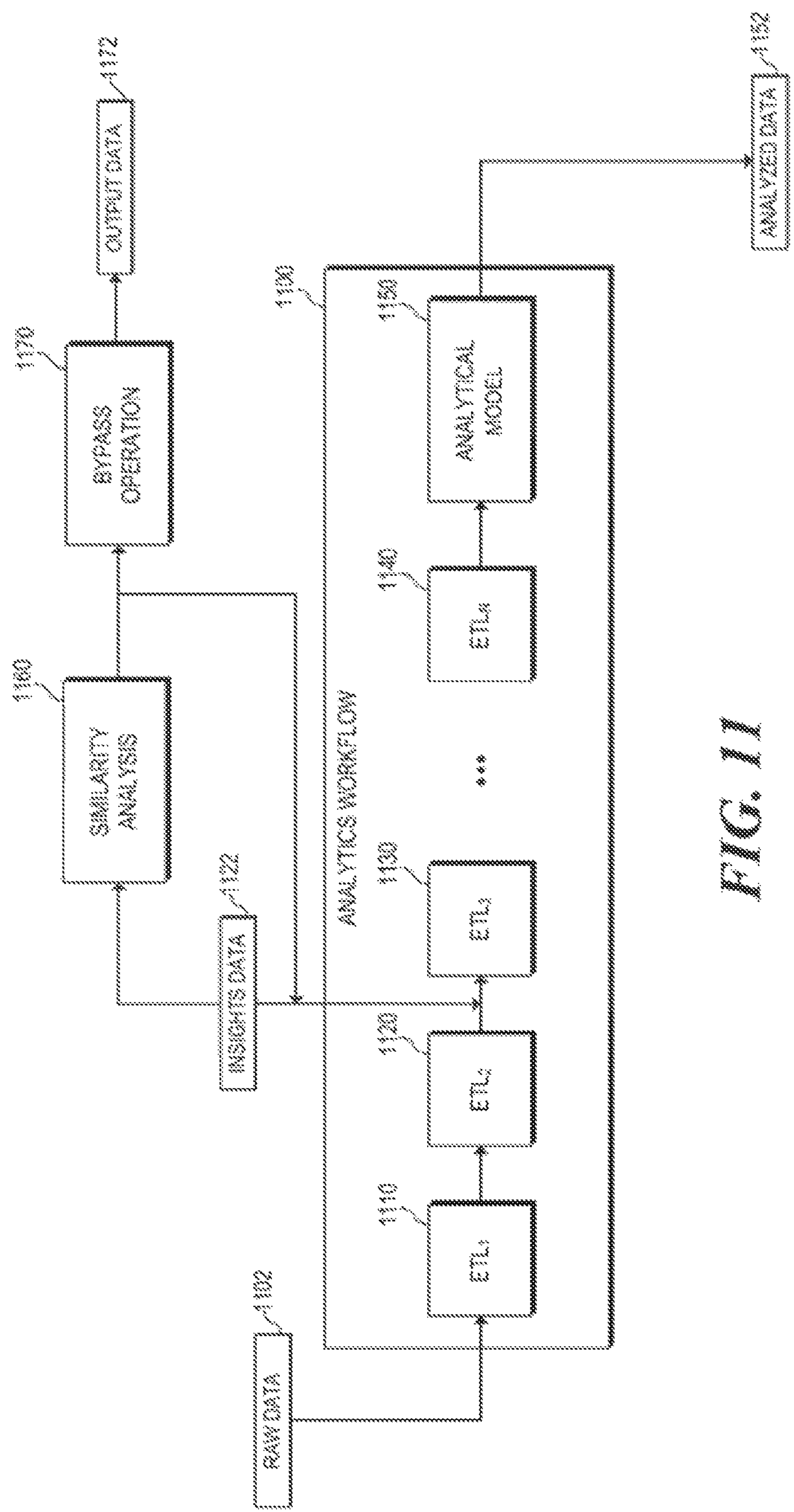
FIG. 11 is a block diagram of an example analytics workflow involving data upon which a similarity analysis and bypass operation may be performed.

FIG. 11 depicts an example analytics workflow 1100. As shown, analytics workflow 1100 includes a first ETL operation ($ETL_1$) 1110, a second ETL operation ($ETL_2$) 1120, a third ETL operation ($ETL_3$) 1130, an Nth ETL operation ($ETL_N$) 1140, and an analytical model 1150. Although four ETL operations and a single analytical model 1150 are shown, an analytics workflow may involve more or less ETL operations and analytical models 1150 than shown. For instance, analytical model 1150 may include multiple analytical models. Similarly, though each ETL operation appears to be a single ETL operation. In some examples, each of $ETL_1$, $ETL_2$, $ETL_3$, and $ETL_N$ may comprise multiple ETL operations. Each of $ETL_1$, $ETL_2$, $ETL_3$, and $ETL_N$ also represent a stage of the analytics workflow 1110, Raw data 1102 may be received by a first ETL operation 1110 of analytics workflow 1100. After first ETL operation 1110 has been performed on raw data 1102, the intermediate data may be passed to second ETL operation 1120, and so on.

In some examples, each ETL operation may aid in reducing or structuring the original raw data. Accordingly, in some such examples, the volume of data after each ETL operation may decrease as the data is organized and structured for use. Although FIG. 11 shows the ETL operations as being executed serially, in some examples, certain ETL operations may be executed concurrently, with partial concurrence, or a combination thereof.

Referring again to FIG. 1, instructions 140 may monitor execution of the analytics workflow upon receipt of raw data at the analytics workflow. The analytics workflow may begin execution upon receiving or ingesting raw data. In some examples, the analytics workflow may be performed at device 100, In other examples, the analytics workflow may be performed remotely (i.e., outside of) from device 100, but instructions 140 may monitor execution of the analytics workflow via a network or communication link. In some such examples, the analytics workflow may be executed in an application framework while the analytics workflow is monitored by a plug-in that is loaded and installed in storage. When raw data is collected or Ingested and received at an analytics workflow, instructions 140 may monitor the execution of the analytics workflow on the raw data. For instance, instructions 140 may monitor when particular ETL operations have been performed, thus determining when the raw date has reached various stages of the analytics workflow.

In some examples, instructions 140 may monitor execution of the analytics workflow by inserting tags, for instance Extensible Markup Language (XML) tags, in toe analytics workflow to associate date with execution of a particular stage, in other examples, instructions 140 may monitor execution of the analytics workflow via a workflow execution log. A workflow execution log may track partial and complete executions of the analytics workflow. In some such examples, instructions 140 may use the workflow execution log to determine at what stage of execution an analytics workflow may be in. In other such examples, the workflow execution log may be used to determine whether the analytics workflow has been previously executed. If it has not, the analytics workflow may be executed in its entirety without any interruption and without performing a similarity analysis.

Instructions 150 of FIG. 1 may interrupt the execution of the analytics workflow at the optimal bypass stage and obtain insights data from the raw data In some examples, based (at least in part) on monitoring the execution of the analytics workflow, the analytics workflow may be Interrupted when the processing of the raw data has reached the optimal bypass stage. The optimal bypass stage may be obtained from instructions 130 or otherwise received or determined. The data at the output of the optimal bypass stage may be referred to as insights data. Insights data, as used herein, may refer to the date at the optimal bypass stage, in some examples, interrupting the execution of the analytics workflow may involve identifying and Interpreting a tag to determine the stage of the analytics workflow and rerouting or passing the insights data to a similarity analysis (described below) when the stage is the optimal bypass stage.

Instructions 160 may receive the insights date and perform a similarity analysis. The similarity analysis may compare the insights data against a stored insights data in an insights data repository 104. As used herein, stored insights data may refer to previously generated insights date from previously executed ETL operations of the analytics workflow that have been stored in an insights data repository. As used herein, the insights data repository may refer to any storage medium that can store insights data. In some examples, insights data repository 104 may be a database, filesystem, or other storage mechanism suitable for storing insights data and/or other intermediate date, i.e., the date output from each ETL operation. In some examples, the insights data repository may be part of an underlying filesystem or storage medium within which intermediate date may be stored. In some such examples, the stored insights date may involve metadata or a tag to index and enable lookup of the stored insights date.

Performing a similarity analysis may involve comparing the insights date with stored insights date to determine whether the insights data is similar to any stored insights data. In some examples, the insights date may be considered similar to stored insights date if it is within a certain range, standard deviation, or correlation of the stored insights date. As described in more detail below, a suitable range, standard deviation, or correlation may be computed, determined, and/or received prior to performing the similarity analysis or at the time of the similarity analysis.

In some examples, performing the similarity analysis at the optimal bypass stage may improve latency and reduce the computational Intensity. In some such examples, foe size of the raw data may be reduced as date progresses through the analytics workflow, allowing for a reduction in the processing power used for the similarity analysis. Performing the similarity analysis at the optimal bypass stage may also allow tor similarities between the insights data and stored Insights data to be exploited. In some such examples, raw data from which the insights data and stored insights data are derived may differ, though operations and transformations at the various stages of the analytics workflow may ultimately result in similar data.

Based (at least in part) on a determination of similarity, instructions 170 may perform a bypass operation to bypass a remainder of the analytics workflow. As used herein, the remainder of the analytics workflow may refer to that portion of the analytics workflow after the optimal bypass stage In some examples, instructions 170 may receive an indication from the similarity analysis that the insights data is similar to a stored insights data in the insights data repository. For instance, the bypass operation may receive the insights data, an identification of the stored insights data, and/or the stored insights data to indicate that the remainder of the analytics workflow should be bypassed. The bypass operation may also receive a set of bits to indicate that the remainder of the analytics workflow should be bypassed.

Performance or execution of the bypass operation may skip or bypass the remainder of the analytics workflow, meaning that portion of the analytics workflow after the optimal bypass stage. In some examples, the bypass operation may terminate the execution of the analytics workflow on the raw data. In other examples, the bypass operation may lag, mark, or otherwise indicate that the execution of the analytics workflow associated with the raw data has been completed.

Referring again to the example of FIG. 11, as shown in analytics workflow 1100, the optimal bypass stage may be second ETL operation 1120. Insights data 1122 is toe output of the optimal bypass stage. A similarity analysis 1160 may be performed on insights data 1122. In some examples, insights data 1122 may be compared against stored insights data in an insights data repository to determine whether Insights data 1122 is similar to stored insights data. Based (at least in part) on a determination of similarity, bypass operation 1170 may bypass the remainder of the analytics workflow 1100.

Instructions 130, 140, 150, 160, and 170 may be executed at an application framework. As used herein, an application framework may refer to a structure that supports the development of the application. Accordingly, the similarity algorithm and the bypass operation may be performed at the application framework. In other examples, instructions 130, 140, 150, 160, and 170 may instead be executed In storage. In some such examples, instructions 130, 140, 150, 160, and 170 may be part of a plug-in that is loaded and installed in storage. As described above in relation to instructions 130, 140, 150, 160, and 170, the plug-ln may track the analytics workflow and perform a similarity analysis and a bypass operation. In some examples, performing the similarity analysis and bypass operation In storage may allow for seamless extraction of stored Insights data and stored data, allow for fewer I/O operations, and expedite the similarity analysis and bypass operation.

In some examples, instructions 130, 140, 150, 160, and 170 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 130, 140, 150, 160, and 170 may be part of an application, applications, or components) already installed on device 100 including processing resource 110, In such examples, the storage medium 120 may include memory such as a hard drive, solid state drive, or the like. In some examples, functionalities described herein in relation to FIG. 1 may be provided In combination with functionalities described herein in relation to any of FIGS. 2-11.

Figure 2:
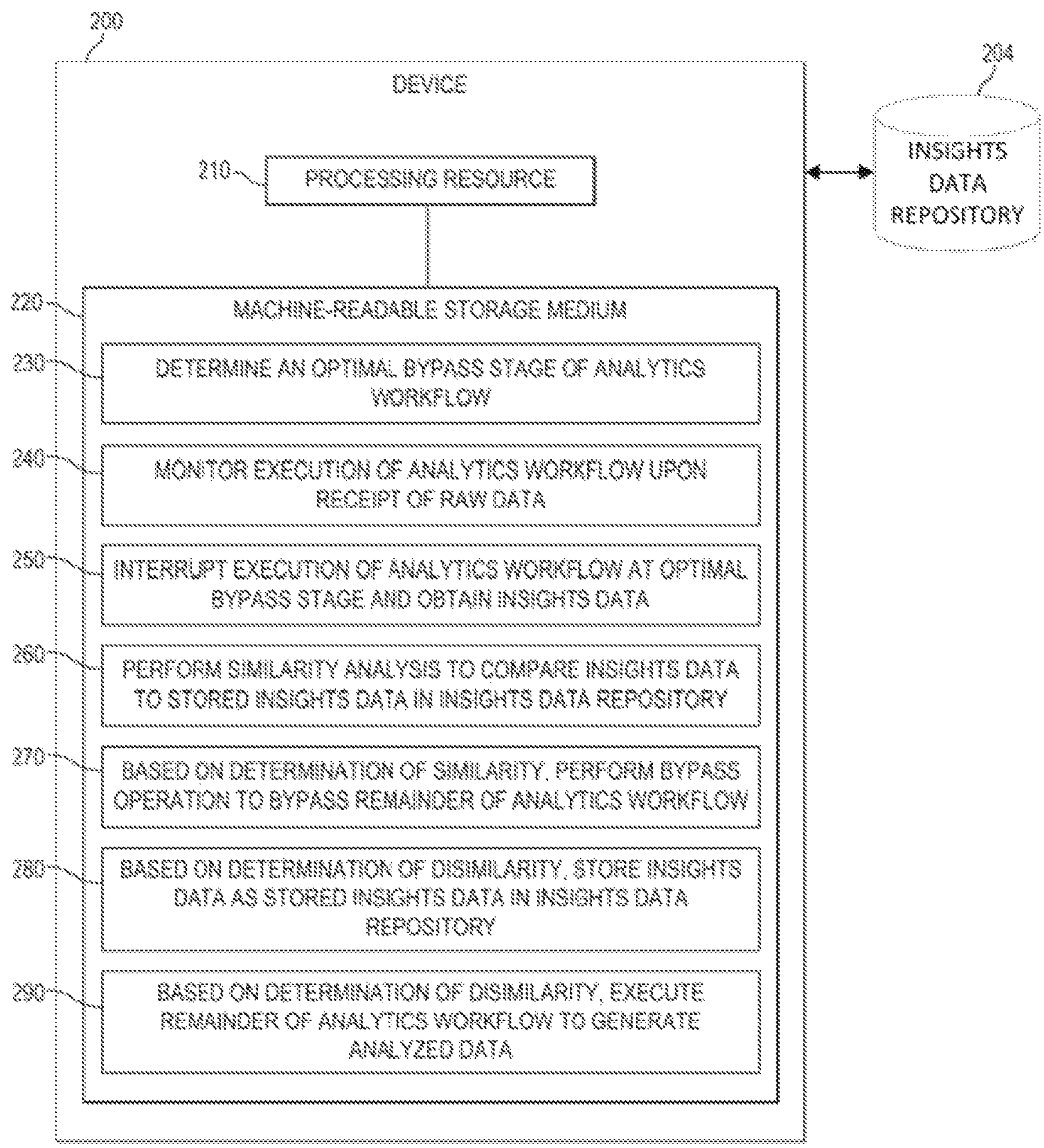
FIG. 2 is a block diagram of an example device having a processing resource and a machine-readable storage medium including instructions to determine an optimal bypass stage, perform a similarity analysis, and based on the analysis, execute the remainder of the analytics workflow.

Further examples are described herein in relation to FIG. 2, which is a block diagram of an example device 200 having a processing resource 210 and a machine-readable storage medium 220 that includes instructions that may bypass a portion of an analytics workflow or execute the analytics workflow based (at least in part) on a similarity analysis. Device 200 includes a processing resource 210 and may be any networking, computing, or storage device suitable for execution of the functionality described below.

As depicted in FIG. 2, device 200 may also include a machine-readable storage medium 220 comprising (e.g., encoded with) instructions 230, 240, 250, 260, 270, and 280 executable by processing resource 210 to implement functionalities described herein In relation to FIG. 2. In some examples, storage medium 220 may include additional instructions. In other examples, the functionalities described herein in relation to instructions 230, 240, 250, 260, 270, 280, and any additional instructions described herein in relation to storage medium 220, may be implemented at least in part in electronic circuitry (e.g., via components comprising any combination of hardware and programming to implement the functionalities described herein).

Processing resource 210 may fetch, decode, and execute instructions stored on storage medium 220 to perform the functionalities described above In relation to instructions 230, 240, 250, 260, 270, aid 280. In other examples, the functionalities of any of foe instructions of storage medium 220 may be implemented In the form of electronic circuitry, in the form of executable instructions encoded on a machine-readable storage medium, or a combination thereof. In the example of FIG. 2, storage medium 220 may be implemented by one machine-readable storage medium, or multiple machine-readable storage media.

Figure 3:
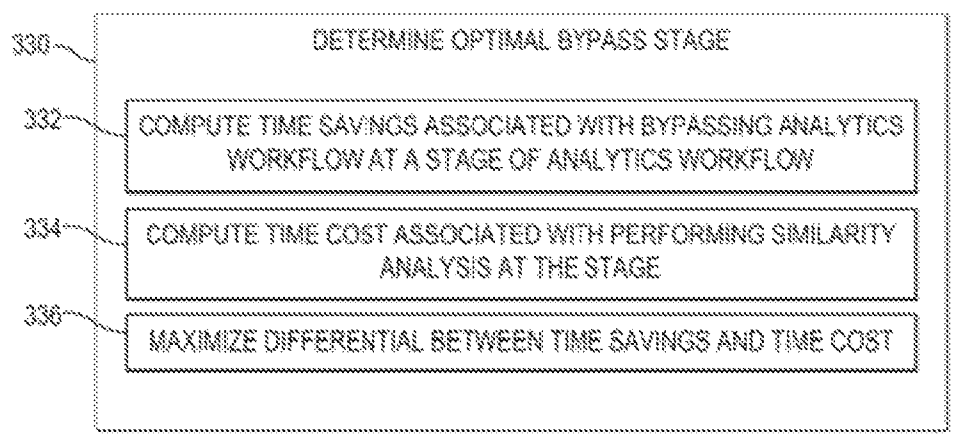
FIG. 3 is a block diagram of example instructions to determine an optimal bypass stage.

As described above in relation to instructions 130 of FIG. 1, instructions 230 of FIG. 2 may determine an optimal bypass stage of an analytics workflow. In some examples, instructions 230 of FIG. 2 may be similar to instructions 330 of FIG. 3. FIG. 3 is a block diagram of example instructions 330 to determine an optimal bypass stage. As depicted in the example of FIG. 3, instructions 330 determine an optimal bypass stage of an analytics workflow via instructions 332, 334, and 336. Instructions 332 may compute a time savings associated with bypassing the analytics workflow at a stage of the analytics workflow. In some examples, instructions 332 may compute the time savings according to the following algorithm:

$$Y_1=(\Sigma T_i, \mathrm{fn}(i)+T_{model\_exec})$$

where: $T_I=T_{IE}+\mathrm{fn}(x_i)$.

$T_I$ represents the time to execute the analytics workflow from an ith stage and is determined by the time for execution of the ith stage and as a function of the volume of data Involved. Specifically, $T_{IE}$ represents the time for execution of the ith stage and $\mathrm{fn}(x_i)$ is a function representative of the volume of data involved, where $x_i$ represents the volume of data for the ith stage $T_{IE}$ may, in some examples, be an average time for execution of a certain volume of data. In other examples, $T_{IE}$ may be determined based on a set of operating conditions, the scarcity or availability of resources, and the like. In yet other examples, $T_{IE}$ may be determined by tracing the analytics workflow. $Y_1$ represents the time savings associated with bypassing the analytics workflow at an ith stage and is determined as a sum of the time to execute the analytics workflow as a function of an ith stage ($T_i$,fn(i)) and, if relevant, a time for applying an analytical model(s) ($T_{model\_exec}$). $T_{model\_exec}$ may, in some examples, be an average time for execution of analytical models on a certain volume of data. In other examples, $T_{model\_exec}$ may be determined based on a set of operating conditions, the scarcity or availability of resources, and the like. In some examples, the time savings, $Y_1$, is determined at each stage of the analytics workflow. An optimal bypass stage may be determined by maximizing time savings.

In some examples, the function representing the volume of data for an ith stage ($\mathrm{fn}(x_i)$) may be represented by a specific amount of time or latency. In such examples, the added latency may be determined by an algorithm that associates various amounts of data with the additional of various amounts of time. In other examples, the function representing the volume of data for an ith stage may be represented by a weight associated with a particular volume of data for the time to execute the analytics workflow at an ith stage. In some such examples, this weight may be determined by an algorithm that accounts for a linear or nonlinear relationship between the volume of data at a particular stage and the time costs associated with particular computational processes performed at the ith stage. In other examples, depending on the particular analytics workflow and whether it includes analytical models, a time for executing analytical models may or may not be included in a computation of the time savings.

Instructions 334 may compute a time cost associated with performing a similarity analysis at the stage. In some examples, instructions 334 may compute the time cost according to the following algorithm;

$$Y_2=(T_{ids}\mathrm{fn}(i)+T_{isc}\mathrm{fn}(i)).$$

$Y_2$ represents the time cost associated with performing a similarity analysis at a stage and is determined by summing the time for reducing data as part of a similarity analysis (described in more detail below in relation to FIG. 4) as a function of an ith stage ($T_{ids}$fn(i)) and a time for executing a similarity algorithm of the similarity analysis as a function of an ith stage ($T_{isc}$fn(i)). $T_{ids}$fn(i) may, in some examples, be an average time for reducing a certain volume of data at the ith stage. The average time may be adjusted or weighted for varying amounts or types of data. In other examples, $T_{ids}$fn(i) may be determined based on a set of operating conditions, the scarcity or availability of resources, and the like. In yet other examples, $T_{ids}$fn(i) may be determined by tracing the operation of the reduction algorithm at the ith stage. $T_{isc}$fn(i) may, in some examples, be an average time executing a similarity algorithm on a certain volume of date at the ith stage. The average time may be adjusted or weighted for varying amounts or types of date. In other examples, $T_{isc}$fn(i) may be determined based on a set of operating conditions, the scarcity or availability of resources, and the like. In yet other examples, $T_{isc}$fn(i) may be determined by tracing the operation of the similarity algorithm at the ith stage. In some examples, $Y_2$, is determined at each stage of the analytics workflow. An optimal bypass stage may be determined by minimizing time cost.

In some examples, $T_{ids}$ may be an average time for reducing a certain volume of date at any stage within the analytics workflow. In some such examples, the function representing the ith stage (fn(i)) may be represented by a weight associated with a particular stage and a particular volume or type of data at the ith stage. Similarly, $T_{isc}$ may, in some examples, be an average time for executing a similarity algorithm at any stage within the analytics workflow and fn(i) may represent a weight associated with a particular stage. The weight may be determined by an algorithm that accounts for a linear or nonlinear relationship between the computational processes performed at the ith stage, the volume of data at the ith stage, the type of data, and the like.

Instructions 336 may maximize a differential between the time savings and the time cost. In some examples, instructions 336 may maximize a differential between the time savings and the time cost according to the following algorithm:

$$Y_3=Y_1-Y_2$$

where: $Y_2<\alpha\mathrm{Vol}$.

$Y_3$ represents a differential between the time savings and the time cost. In some examples, $Y_3$ may be computed for each stage of an analytics workflow and the stage having the largest differential may be selected as the optimal bypass stage In some examples, $Y_3$ may be subject to $Y_2$ being less than a percentage of the total workflow execution time of flows for which similarity does not exist ($\alpha$Vol). In some such examples, a similarity analysis may not be performed if the similarity analysis adds a significant overhead or adds to the total workflow execution time by more than an acceptable percentage (e.g., if execution of a dissimilar case flow takes a certain amount longer with the similarity analysis than the execution of the original case flow).

As described above, FIG. 11 depicts an example analytics workflow 1100. As shown, analytics workflow 1100 includes a first ETL operation ($ETL_1$) 1110, a second ETL operation ($ETL_2$) 1120, a third ETL operation ($ETL_1$) 1130, an Nth ETL operation ($ETL_N$) 1140, and an analytical model 1150. Although four ETL operations are shown, an analytics workflow may involve more or less ETL operations than shown. Moreover, though each ETL operation appears to be a single ETL operation, in some examples, each of $ETL_1$, $ETL_2$, $ETL_3$, and $ETL_N$ may comprise multiple ETL operations. Each of $ETL_1$, $ETL_2$, $ETL_3$, and $ETL_N$ also represent a stage of the analytics workflow 1110. Raw data 1102 may be received by a first ETL operation 1110 of analytics workflow 1100. After first ETL operation 1110 has been performed on raw data 1102, the intermediate date may be passed to second ETL operation 1120, and so on.

In some examples, each ETL operation may aid in reducing the size of or structuring the original raw data. Accordingly, in some such examples, the volume of data after each ETL operation may decrease as the date is organized and structured for use. Although FIG. 11 shows the ETL operations as being executed serially, in some examples, certain ETL operations may be executed concurrently, with partial concurrence, or a combination thereof. As shown in analytics workflow 1100, the optimal bypass stage may be second ETL operation 1120. Insights data 1122 is the output of the optimal bypass stage.

Referring again to FIG. 2, instructions 240 may monitor execution of the analytics workflow upon receipt of raw data, as described above in relation to instructions 140 of FIG. 1. Instructions 250 of FIG. 2 may interrupt the execution of the analytics workflow at the optimal bypass stage and obtain insights data from the raw data, as described above in relation to instructions 150 of FIG. 1.

Figure 4:
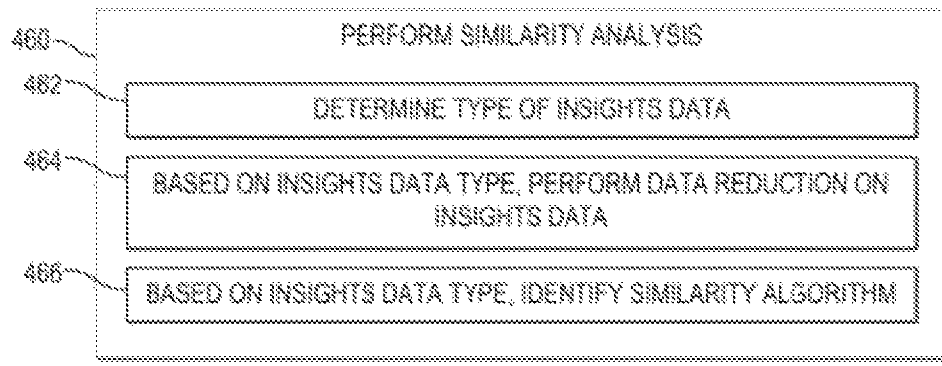
FIG. 4 is a block diagram of example instructions to perform a similarity analysis.

Instructions 260 may receive the insights data and perform a similarity analysis, as described above in relation to instructions 160 of FIG. 1, In some examples, instructions 260 of FIG. 2 may be similar to instructions 460 of FIG. 4. FIG. 4 is a block diagram of example instructions 460 to perform a similarity analysis. As depicted in the example of FIG. 4, instructions 460 perform a similarity analysis via Instructions 462, 464, and 466. Instructions 460 may perform the similarity analysis to compare the insights data to a stored insights data in an insights data repository.

In some examples, upon receiving insights data, a similarity analysis may involve instructions 462 to determine a type of insights data. In some examples, instructions 462 may analyze the insights data to determine a type. The types of data may involve whether the data is structured or unstructured, image data, audio data, video data, character strings, integers, or the like.

Based (at least in part) on the insights data type, the similarity analysis may involve performing a reduction of the insights data. Data reduction may minimize a time cost and computational cost associated with a similarity analysis. For example, data reduction may provide greater information density, allowing for fewer operations to be performed on the data. In such examples, instructions 464 may perform a data reduction on insights data to generate reduced insights data. Instructions 464 may utilize a reducing algorithm, dependent on the type of data, to obtain a representative sample of insights data. For Instance, instructions 464 may apply data transformation functions or dimension reduction algorithms such as Haar wavelet, Fourier, or the like for time series data. In some examples, instructions 464 may apply filtering. Locality Sensitive Hashing (LSH), or the like for image data. In other examples, instructions 464 may perform text summarization algorithms or the like for unstructured text information. In yet other examples, instructions 462 may perform random or periodic sampling of insights data to reduce the data.

Based (at least in part) on a determination of the insights data type, instructions 466 may identify a similarity algorithm. In some examples, the similarity algorithm may be used to compare the (reduced) insights data to the stored insights data. In some examples, a repository may store a set of similarity algorithms, one of which may be identified for use depending on the insights data type. As an example, for text information, the similarity algorithms may include a Jaccard similarity algorithm or a cosine similarity algorithm. In another example, for numeric data, the similarity algorithms may include sorting or comparison algorithms. The identified similarity algorithm may be used to compare foe (reduced) insights data to a stored insights data. In some examples, the similarity algorithm may search a stored insights repository for stored insights data similar to the insights data. In some such examples, the insights data repository may be indexed and the similarity algorithm may search the index for stored insights data that is similar to the insights data. The insights data repository may be indexed via a hashing function or the tike.

In some examples, similarity may be determined by a threshold associated with each stored insights date in the insights data repository. As described in more detail below in relation to FIG. 6, each stored insights data within the insights data repository may be associated with a threshold. As used herein, a threshold may refer to a range, a standard of deviation, or a correlation, within which data may be considered similar. If the reduced insights data fells within the particular threshold associated with a stored insights data, the reduced insights data may be considered similar to the stored insights data. If, however, the reduced insights data falls outside the particular threshold associated with a stored insights data, the reduced insights data may be considered dissimilar to the stored insights data. In some examples, the similarity algorithm may perform this comparison for each stored insights data within the insights data repository. In such examples, if the insights data is considered similar to multiple stored insights data, the similarity algorithm may determine the most similar stored insights date. In other examples, the similarity algorithm may perform this comparison until a first determination of similarity, in yet other examples, the similarity algorithm may analyze an index within the insights date repository to determine a reduced listing of stored insights date with which to compare the insights date.

Figure 5:
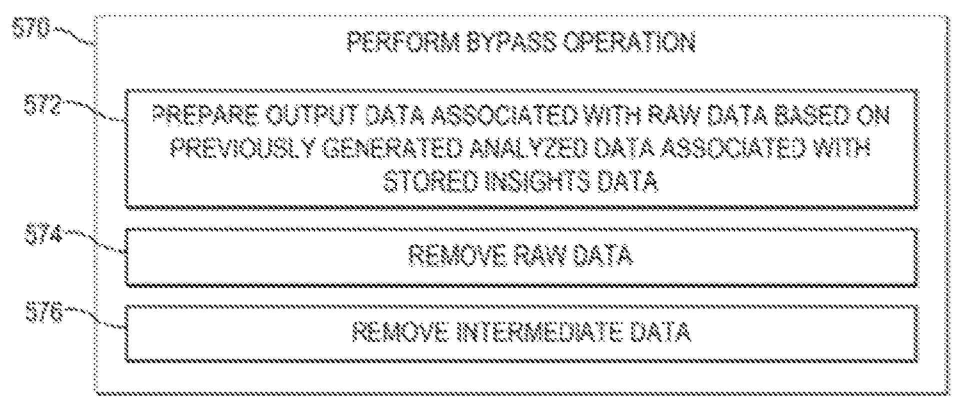
FIG. 5 is a block diagram of example instructions to perform a bypass operation.

Referring again to FIG. 2, based (at least in part) on a determination of similarity, instructions 270 may perform a bypass operation to bypass a remainder of the analytics workflow, as described above in relation to instructions 170 of FIG. 1, In some examples, instructions 270 of FIG. 2 may be similar to instructions 570 of FIG. 5. FIG. 5 is a block diagram of example instructions 570 to perform a bypass operation. As depicted in foe example of FIG. 5, instructions 570 may perform a bypass operation via instructions 572 and 574. In some examples, as depicted in the example of FIG. 5, instructions 570 may also include instructions 576.

In some examples, based (at least in part) on a determination of similarity, Instructions 572 may prepare output data associated with the raw data. The output data may be based on previously generated analyzed data associated with stored insights data Analyzed data, as used herein, may refer to the output of an analytics workflow. Previously generated analyzed data, as used herein, may refer to the output of fee analytics workflow associated with a stored insights data. Instructions 572 may request and receive or otherwise obtain the stored Insights data (or a stored insights data identifier) to which the insights data is determined to be similar to. In some such examples, instructions 572 may locate a previously generated analyzed data associated with the stored insights data. The previously generated analyzed data may be stored in primary, secondary, or other storage and in some examples, the output data may comprise a pointer or a tag indicating toe location of the previously generated analyzed data, in other examples, the output data may comprise a snapshot or smart copy of the previously generated analyzed data. In yet other examples, the output data may comprise a duplicate copy of the previously generated analyzed data.

In some examples, performing the bypass operation may further comprise instructions 574 to remove the raw data. In some examples, removing the raw data associated with the output date may involve deleting the raw data or a failure to move toe raw data from a temporary storage such as a cache storage to a more permanent storage location. In other examples, removing the raw data may involve tiering the data, e.g., relocating the raw data from a more accessible or fester storage location to a slower storage location. For instance, it may involve removing the raw data to secondary or tertiary storage rather than primary storage or removing the raw data to cloud storage.

In yet other examples, removing the raw data may involve marking the raw data for removal In such examples, the raw data may be used or accessed by multiple workflows. Marking the raw data may involve the addition of metadata associated with the raw date, tagging the raw data, or otherwise indicating that the raw date should be removed or considered for removal. Based on marking the raw data for removal, a determination may be made as to whether the raw data may be used by any other workflows or processes. If the raw date will not be used, the raw date may be deleted or tiered, as described above. If, however, the raw data will be used, the raw data may not be deleted or tiered until a determination that the raw data will no longer be used or accessed by any other workflow or process.

Performing the bypass operation 570 may also comprise instructions 576 to remove an intermediate date, e.g., a data output from an ETL operation. In some examples, intermediate date from each ETL operation may be stored. In other examples, some of the intermediate data may be removed. In some such examples, instructions 576 may remove the intermediate data based (at least in part) on a determination of similarity and alter the output date has been prepared. Removing the intermediate data may involve deleting the date or not moving the intermediate data from a temporary storage such as a cache storage to a more permanent storage location. In other examples, removing the intermediate data may involve tiering the date, e.g., relocating the intermediate date from a more accessible or taster storage location to a slower storage location. For instance, it may involve removing the intermediate date to secondary or tertiary storage rather than primary storage or removing the intermediate date to cloud storage.

In yet other examples, removing the intermediate data may involve marking tee intermediate data for removal. In such examples, the intermediate date may be used or accessed by multiple workflows. Marking the intermediate data may involve the addition of metadata associated with the intermediate data, tagging the intermediate date, or otherwise indicating that the intermediate data should be removed or considered for removal. Eased on marking the intermediate data for removal, a determination may be made as to whether the intermediate date may be used by any other workflows or processes. If the intermediate date will not be used, the intermediate date may be deleted or tiered, as described above. If, however, the intermediate date will be used, the intermediate date may not be deleted or tiered until a determination that the intermediate data will no longer be used or accessed by any other workflow or process.

Figure 6:
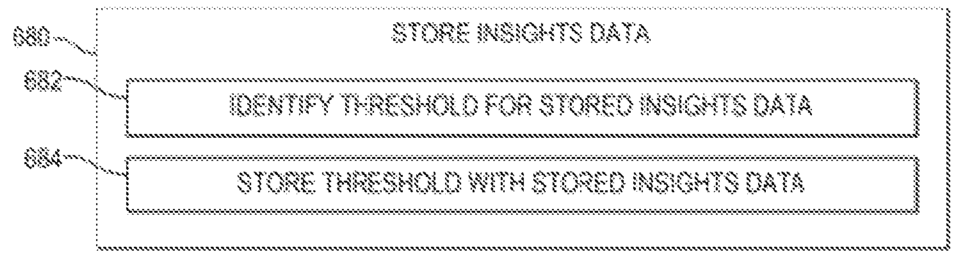
FIG. 6 is a block diagram of example instructions to store insights data.

Referring again to FIG. 2, based (at least in part) on a determination of dissimilarity, instructions 280 may store the insights data as stored insights data in the insights data repository. Storing dissimilar insights date within the insights date repository may allow for a greater number of data points for future similarity analyses. In some examples, instructions 280 of FIG. 2 may be similar to instructions 680 of FIG. 6. FIG. 6 is a block diagram of example Instructions 680 to store insights data. As depicted in the example of FIG. 6, instructions 680 may perform a similarity analysis that includes instructions 382 and 684.

In storing the insights data as stored insights date in the insights date repository, instructions 682 may identify a threshold for the stored insights date. As used herein, a threshold may refer to a range, a standard of deviation, or a correlation, within which date may be considered similar. A threshold may be identified based (at least in part) on the date type. For instance, a threshold for unstructured text information may involve a Jaccard similarity coefficient or a Jaccard distance. A threshold for numeric information may involve a range bounded by an upper bound and a tower bound. In some examples, the threshold may be identified based (at least in part) on the particular application. In one example, an application that involves fine-grained predictions and analysis may use a smaller threshold having smaller upper and lower bounds to ensure a greater degree of similarity. On the other hand, an application that may tolerate a greater degree of error or that prioritizes speed my use a larger threshold having larger upper and lower bounds, ensuring that more data sets may be found to be similar (and thus more analytics workflows bypassed).

Instructions 684 may store the threshold with the stored insights data, in some such examples, each stored insights data may have an associated threshold that is stored in the insights data repository (e.g., insights data repository 204 of FIG. 2) with the stored insights data. In other examples, the threshold may be stored separately from foe stored insights data.

Returning to FIG. 2, based (at least in part) on a determination of dissimilarity, instructions 290 may execute the remainder of the analytics workflow to generate analyzed data. The remainder of the analytics workflow, as described above and used herein, may refer to that portion of the analytics workflow after the optimal bypass stage. As described above and used herein, analyzed data may refer to the output of an analytics workflow. In some examples, the remainder of the analytics workflow may be executed in an application framework Instructions 290 may return to the remainder of the analytics workflow via tags, for instance XML tags, that associate data in the analytics workflow with foe execution of a particular stage.

Referring again to the example of FIG. 11, as shown in analyte workflow 1100, a similarity analysis 1160 may be performed on insights data 1122. For instance, insights data 1122 may be compared against stored insights data in an insights data repository via a similarity algorithm to determine whether insights data 1122 is similar to stored insights data. Based (at least In part) on a determination of similarity, bypass operation 1170 may bypass the remainder of the analyte workflow 1100 and prepare output data 1172, As shown in FIG. 11, the remainder of the analytics workflow 1100 includes third ETL operation 1130 through Nth ETL operation 1140 and analytical model 1150. Based (at least in part) on a determination of dissimilarity, the execution of analyte workflow 1100 may be resumed at the third ETL operation 1130. The remainder of analytics workflow 1100 may be executed, including the performance of analytical model 1150, as relevant. The output of analytics workflow 1100 is analyzed data 1152.

The accuracy of the similarity analysis may be checked in some examples. In some instances when the insights data has been determined to be similar to a stoned insights data, the remainder of the analytics workflow may still be executed. The output data generated by the bypass operation may be compared to the analyzed data generated by the analytics workflow to determine the accuracy of the similarity analysis, if the accuracy check shows an unacceptable deviation (i.e., the result indicates inaccuracy), the threshold for the stored Insights data may be adjusted and/or the similarity algorithm may be adjusted.

In other examples, the percentage of determinations of similarity and determination of dissimilarity may be tracked, monitored, or periodically calculated. If the percentage of dissimilarity determinations exceeds a certain amount or is otherwise found to be unacceptable, a new optimal bypass stage may be determined or the similarity analysis may not be performed.

Instructions 230, 240, 250, 260, 270, 280, and 290 may be executed at an application framework. Accordingly, the similarity algorithm and the bypass operation may be performed at the application framework. In other examples, instructions 230, 240, 250, 260, 270, 280, and 290 may instead be executed in storage. In soma such examples, instructions 230, 240, 250, 260, 270, 280, and 290 may be part of a plug-in that is loaded and installed in storage. As described above in relation to instructions 230, 240, 250, 260, 270, 280, and 290, the plug-in may track the analytics workflow and perform a similarity analysis and a bypass operation. In some examples, performing the similarity analysis and bypass operation in storage may allow for seamless extraction of stored insights data, previously generated analyzed data, and other stored data, may allow for fewer I/O operations, may expedite the similarity analysis and bypass operation, may allow for transparent tiering of raw data and intermediate data, and may allow for insights data to be embedded within a storage management layer.

In some examples, instructions 230, 240, 250, 260, 270, 280, and 290 may be part of an installation package that, when installed, may be executed by processing resource 210 to implement the functionalities described above. In such examples, storage medium 220 may be a portable medium, such as a CD, DVD, or flash drive, or a memory maintained by a server from which the installation package can be downloaded and installed. In other examples, instructions 230, 240, 250, 260, 270, 280, and 290 may be part of an application, applications, or components) already installed on device 200 including processing resource 210. In such examples, the storage medium 220 may include memory such as a hard drive, solid state drive, or the like. In some examples, functionalities described herein in relation to FIG. 2 may be provided in combination with functionalities described herein in relation to any of FIGS. 1 and 3-11.

Figure 7:
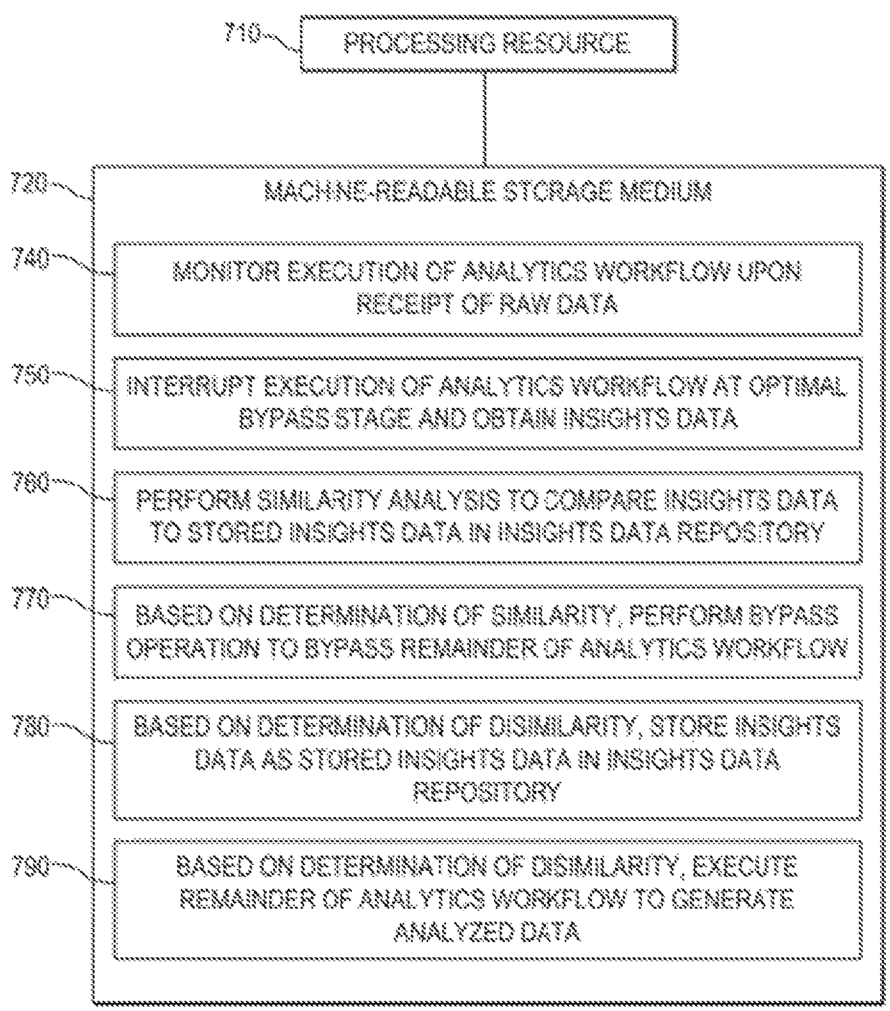
FIG. 7 is a block diagram of an example machine-readable storage medium including instructions to bypass or execute a remainder of the analytics workflow based on a similarity analysis.

Further examples are described herein in relation to FIG. 7, which is a block diagram of an example machine-readable storage medium 720 that includes instructions to bypass a remainder of an analytics workflow or execute a remainder of the analytics workflow based (at least in part) on a similarity analysis. The example of FIG. 7 includes machine-readable storage medium 720 comprising instructions 740, 750, 760, 770, 780, and 790, executable by a processing resource 710. In some examples, machine-readable storage medium 720 and processing resource 710 may be located on a same device, such as device 100 or device 200 of FIGS. 1 and 2, respectively. In other examples, machine-readable storage medium 720 and processing resource 710 may be located remotely from one another (e.g., on different devices), but accessible via a network or communication link. For instance, in some such examples, the analytics workflow may be executed in an application framework that is run on a host.

Instructions 740 may monitor execution of an analytics workflow upon receipt of raw data at the analytics workflow, as described above in relation to instructions 140 of FIG. 1 and instructions 240 of FIG. 2. Instructions 750 may interrupt execution of the analytics workflow at the optimal bypass stage and obtain insights data from the raw data, as described above in relation to Instructions 150 of FIG. 1 and instructions 250 of FIG. 2.

Instructions 760 may receive the insights data and perform a similarity analysis to compare the insights data to a stored insights data in an insights data repository, as described above in relation to instructions 160 and 260 of FIGS. 1 and 2, respectively, and FIG. 4. In some examples, performing the similarity analysis may involve determining the type of insights data, as described above in relation to instructions 462 of FIG. 4, Based (at least in part) on the insights data type, the similarity analysis may further involve performing a reduction of the insights data to generate reduced insights data, as described above in relation to instructions 464 of FIG. 4. Based (at least in part) on the insights data type, the similarity analysis may also involve identifying a similarity algorithm to compare the reduced insights data to the stored insights data and an associated threshold, as described above in relation to Instructions 466 of FIG. 4.

Based (at least in part) on a determination of similarity, instructions 770 may perform a bypass operation to bypass a remainder of the analytics workflow, as described above in relation to instructions 170 and 270 of FIGS. 1 and 2, respectively, and FIG. 5. In some examples, performing the bypass operation may involve preparing output data associated with the raw data, as described above in relation to instructions 572 of FIG. 5. As described above, the output data may be based on previously generated analyzed data associated with stored insights data. Performing the bypass operation may further involve removing the raw data associated with the output data, as described above in relation to instructions 574 of FIG. 5.

Based (at least in part) on a determination of dissimilarity, instructions 780 may store the insights data as stored insights data in the insights data repository, as described above in relation to instructions 280 of FIG. 2 and FIG. 6. In some examples, storing the insights data may involve identifying a threshold for the stored insights data, as described above in relation to instructions 682 of FIG. 6. Storing the insights data may also involve storing the threshold with the stored insights data, as described above in relation to instructions 684 of FIG. 6.

Based (at least in part) on a determination of dissimilarity, instructions 790 may execute the remainder of the analytics workflow to generate analyzed data, as described above in relation to instructions 290 of FIG. 2.

As described above, in some examples, intermediate data may be stored, whereas in other examples, intermediate data may be removed after the output data has been prepared and stored or after the analyzed data has been generated and stored. In some examples, a workflow execution log may be used to track partial and complete executions of the analytics workflow. The workflow execution log may be maintained within toe application framework or, in some examples, within storage, as described above.

Instructions 740, 750, 760, 770, 780, and 790 may be executed at an application framework. Accordingly, the similarity algorithm and the bypass operation may be performed at the application framework. In other examples, instructions 740, 750, 760, 770, 780, and 790 may Instead be executed in storage. In some such examples, instructions 740, 750, 760, 770, 780, and 790 may be part of a plug-in that may be loaded and installed in storage. As described above in relation to instructions 740, 750, 760, 770, 780, and 790, the plug-in may track the analytics workflow and perform a similarity analysis and a bypass operation.

In some examples, instructions 740, 750, 760, 770, 780, and 790 may be part of an installation package that, when installed, may be executed by processing resource 710 to implement the functionalities described above. In such examples, storage medium 720 may be a portable medium, such as a CD, DVD, or flash drive, or a memory maintained by a server from which the installation package can be downloaded and installed. In other examples, instructions 740, 750, 760, 770, 780, and 790 may be part of an application, applications, or components) for execution by processing resource 710. In such examples, the storage medium 720 may include memory such as a hard drive, solid state drive, or the like. In some examples, functionalities described herein in relation to FIG. 7 may be provided in combination with functionalities described herein in relation to any of FIGS. 1-6 and 8-11.

Figure 8:
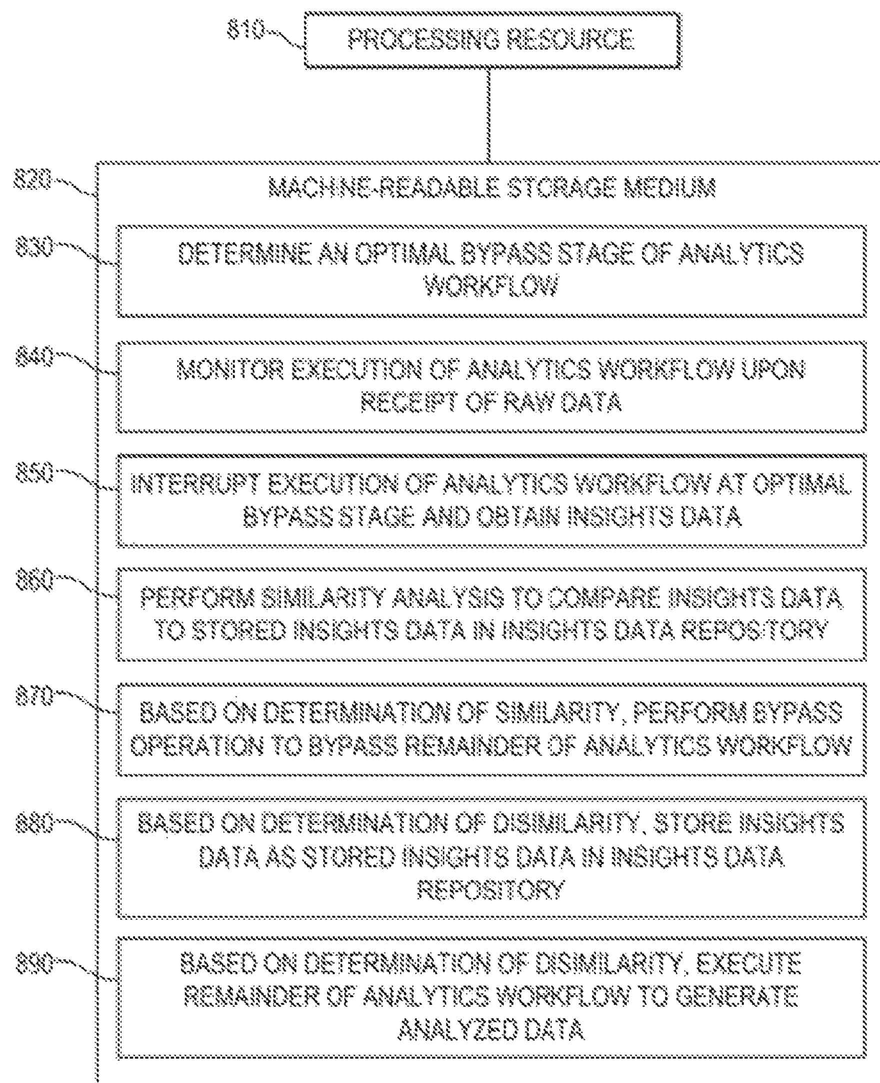
FIG. 8 is a block diagram of an example machine-readable storage medium including instructions to determine an optimal bypass stage and bypass or execute a remainder of the analytics workflow based on a similarity analysis.

FIG. 8 is a block diagram of an example machine-readable storage medium 820 that includes instructions to bypass a remainder of an analytics workflow or execute a remainder of the analytics workflow based (at least in part) on a similarity analysis. The example of FIG. 8 includes machine-readable storage medium 820 comprising instructions 830, 840, 850, 860, 870, 880, and 890, executable by a processing resource 810. In some examples, machine-readable storage medium 820 and processing resource 810 may be located on a same device, such as device 100 or device 200 of FIGS. 1 and 2, respectively. In other examples, machine-readable storage medium 820 and processing resource 810 may be located remotely from one another (e.g., on different devices), but accessible via a network or communication link. For Instance, in some such examples, the analytics workflow may be executed in an application framework that is run on a host.

Instructions 830 may determine an optimal bypass stage of the analytics workflow, as described above in relation to instructions 130 and 230 of FIGS. 1 and 2, respectively, and FIG. 3, In some examples, determining an optimal bypass stage may involve computing a time savings associated with bypassing the analytics workflow at a stage of the analytics workflow, as described above in relation to instructions 332 of FIG. 3. Determining an optimal bypass stage may further involve computing a time cost associated with performing a similarity analysis at that stage, as described above in relation to instructions 334 of FIG. 3. The optimal bypass stage may then be determined by maximizing a differential between the time savings and the time cost, as described above in relation to instructions 336 of FIG. 3.

Instructions 840 may monitor execution of an analytics workflow upon receipt of raw data at the analytics workflow, as described above in relation to instructions 140 of FIG. 1 and instructions 240 of FIG. 2, Instructions 850 may interrupt execution of the analytics workflow at the optimal bypass stage and obtain insights data from the raw data, as described above in relation to instructions 150 of FIG. 1 and Instructions 250 of FIG. 2.

Instructions 860 may receive the insights data and perform a similarity analysts to compare the insights date to a stored insights date in an insights data repository, as described above in relation to instructions 160 and 260 of FIGS. 1 and 2, respectively, and FIG. 4. In some examples, performing the similarity analysis may involve determining the type of insights date, as described above in relation to Instructions 462 of FIG. 4. Based (at least in part) on the insights data type, the similarity analysis may further involve performing a reduction of the insights data to generate reduced insights data, as described above in relation to instructions 464 of FIG. 4. Based (at least in part) on the insights date type, the similarity analysis may also involve identifying a similarity algorithm to compare the reduced insights date to the stored insights date and an associated threshold, as described above in relation to instructions 466 of FIG. 4.

Based (at least in part) on a determination of similarity, instructions 870 may perform a bypass operation to bypass a remainder of the analytics workflow, as described above in relation to instructions 170 and 270 of FIGS. 1 and 2, respectively, and FIG. 5. In some examples, performing the bypass operation may involve preparing output date associated with the raw data, as described above in relation to instructions 572 of FIG. 5. As described above, the output data may be based on previously generated analyzed data associated with stored insights data. Performing the bypass operation may further involve removing the raw date associated with the output data, as described above in relation to instructions 574 of FIG. 5.

Based (at least in part) on a determination of dissimilarity, instructions 880 may store the insights date as stored insights date in the insights date repository, as described above in relation to instructions 280 of FIG. 2 and FIG. 6 in some examples, storing the insights date may involve identifying a threshold for the stored insights date, as described above in relation to instructions 682 of FIG. 6. Storing the insights date may also involve storing the threshold with the stored insights date, as described above in relation to instructions 684 of FIG. 6.

Based (at least in part) on a determination of dissimilarity, instructions 890 may execute the remainder of the analytics workflow to generate analyzed data, as described above in relation to instructions 290 of FIG. 2.

As described above, in some examples, intermediate date may be stored, whereas in other examples, intermediate data may be removed after the output date has been prepared and stored or after the analyzed date has been generated and stored. In some examples, a workflow execution log may be used to track partial and complete executions of the analytics workflow. The workflow execution log may be maintained within the application framework or, in some examples, within storage, as described above.

Instructions 830, 840, 850, 860, 870, 880, and 890 may be executed at an application framework. Accordingly, the similarity algorithm and the bypass operation may be performed at the application framework. In other examples, instructions 830, 840, 850, 860, 870, 880, and 890 may instead be executed in storage. In some such examples, instructions 830, 840, 850, 860, 870, 880, and 890 may be part of a plug-in that may be loaded and installed in storage. As described above in relation to instructions 830, 840, 850, 860, 870, 880, and 890, the plug-in may back the analytics workflow and perform a similarity analysis and a bypass operation.

In some examples, instructions 830, 840, 850, 860, 870, 880, and 890 may be part of an installation package that, when installed, may be executed by processing resource 810 to implement Ore functionalities described above. In such examples, storage medium 820 may be a portable medium, such as a CD, DVD, or flash drive, or a memory maintained by a server from which the installation package can be downloaded and installed. In other examples, Instructions 830, 840, 850, 860, 870, 880, and 890 may be part of an application, applications, or component(s) for execution by processing resource 810. In such examples, the storage medium 820 may include memory such as a hard drive, solid state drive, or the tike. In some examples, functionalities described herein in relation to FIG. 8 may be provided in combination with functionalities described herein in relation to any of FIGS. 1-7 and 9-11.

Figure 9:
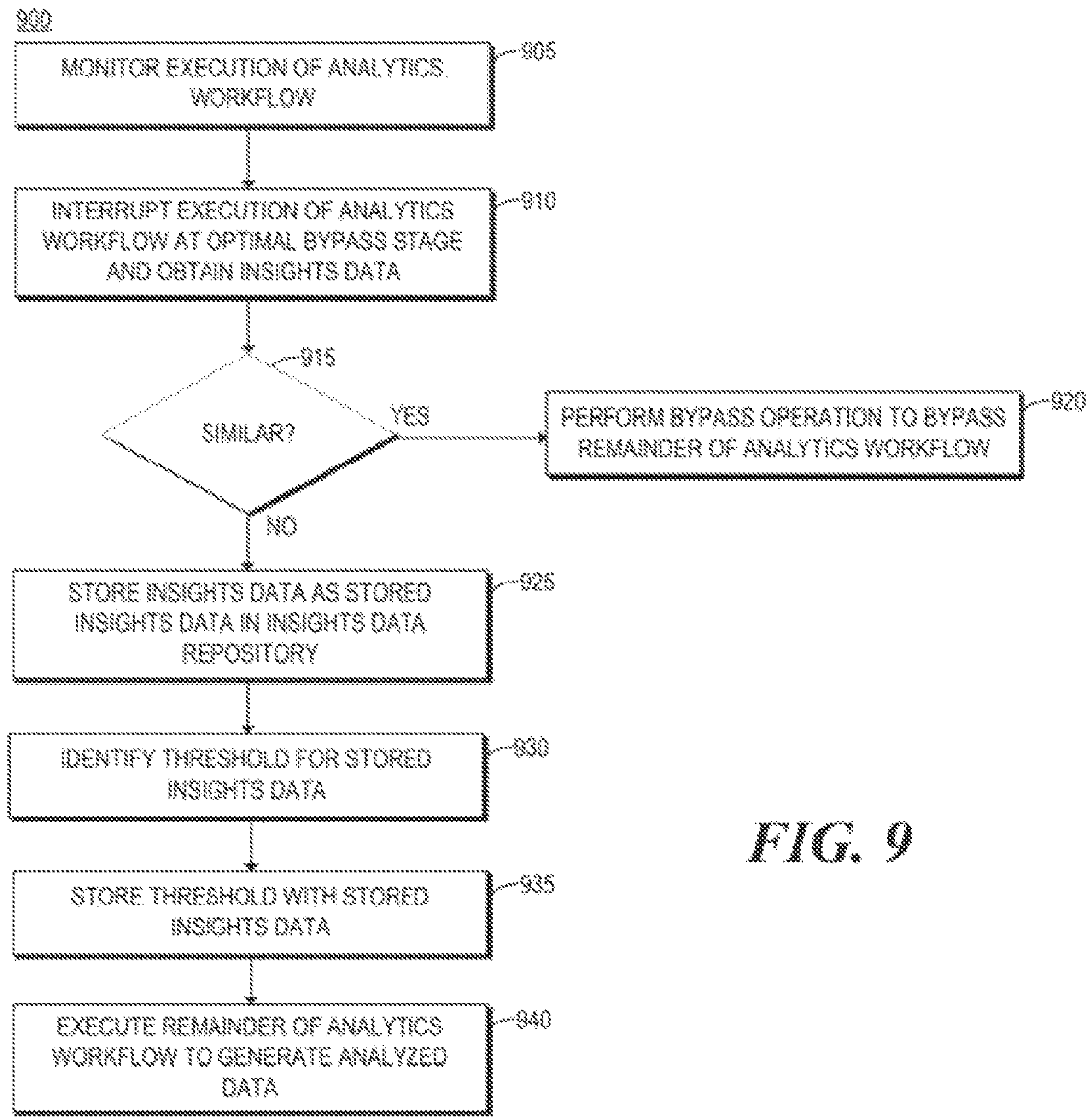
FIG. 9 is a flowchart of an example method for analytics workflow including performing a similarity analysis and based on a determination of dissimilarity, storing insights data as stored insights data, identifying a threshold for the stored insights date, and executing a remainder of the analytics workflow.

FIG. 9 is a flowchart of an example method 900 for analytics workflow including performing a similarity analysis and based (at least in part) on a determination of dissimilarity, storing insights data as stored insights data, identifying a threshold for foe stored insights data, and executing a remainder of the analytics workflow. Although execution of method 900 is described below with reference to device 200 of FIG. 2, other suitable systems for the execution of method 900 can be utilized (e.g., device 100 of FIG. 1). Additionally, implementation of method 900 is not limited to such examples.

In the example of FIG. 9, method 900 may be a method of device 200. At 905, instructions 240 may monitor execution of the analytics workflow upon receipt of raw data. This monitoring may be performed as described above in relation to instructions 240 of FIG. 2. In some examples, instructions 240 may monitor the execution of the analytics workflow via tags that associate data within the analytics workflow with the execution of a particular stage of the workflow. In other examples, instructions 240 may monitor execution of the analytics workflow via a workflow execution log.

In some examples, Instructions 240 may determine when raw data has been received at the analytics workflow by reviewing tags associated with data in the analytics workflow and/or by reviewing the workflow execution log. Instructions 240 may also determine when raw data has been received at the analytics workflow and begin monitoring execution of the analytics workflow by monitoring a data collection or data gathering mechanism.

At 910, instructions 250 may interrupt the execution of the analytics workflow at the optimal bypass stage and obtain Insights data from the raw data, as described above in relation to instructions 250 of FIG. 2. At 915, instructions 260 may perform a similarity analysis to compare the insights data to a stored insights data in an insights data repository. This similarity analysis may be performed as described above in relation to instructions 260 of FIG. 2 and as described above in relation to FIG. 4. Performing the similarity analysis may Involve determining a type of insights data, as described above in relation to instructions 462 of FIG. 4. Based (at least in part) on the insights data type, a data reduction may be performed on the insights data, as described above in relation to instructions 464 of FIG. 4. Based (at least in part) on the insights data type, a similarity algorithm may be identified for the insights data type, as described above in relation to instructions 466 of FIG. 4.

Based (at least in part) on a determination of similarity, method 900 may proceed to 920. At 920, instructions 270 may perform a bypass operation to bypass a remainder of the analytics workflow. This bypass operation may be performed as described above in relation to instructions 270 of FIG. 2 and as described above In relation to FIG. 5, Based (at least in part) on a determination of dissimilarity, method 900 may proceed to 925. At 925, instructions 280 may store the insights data as stored insights data in the insights data repository, as described above in relation to FIG. 2. In storing the insights data as stored insights data, a threshold may be Identified for the stored insights data at 930, as described above in relation to instructions 682 of FIG. 6. The threshold may be stored with the stored Insights data in the insights data repository at 935, as described above in relation to instructions 684 of FIG. 6. Based (at least in part) on the determination of dissimilarity, at 940, Instructions 290 may execute the remainder of the analytics workflow to generate analyzed data, as described above in relation to FIG. 2.

In some examples, method 900 may further involve storing or removing intermediate data, i.e., a data output from an ETL operation. In other examples, method 900 may be executed at an application framework. In some such examples, the intermediate data may be removed after fie output data has been prepared and stored or alter the analyzed data has been generated and stored.

In some examples, method 900 may be executed in an application framework. In other examples, method 900 may be executed within storage. Performing the similarity analysis and bypass operation in storage may allow for seamless extraction of stored insights data, previously generated analyzed data, and other stored data, may allow for fewer I/O operations, and may expedite the similarity analysis and bypass operation.

Method 900 may also involve checking the accuracy of the similarity analysis. In some instances when the insights data has been determined to be similar to a stared insights data, the remainder of the analytics workflow may still be executed. The output data generated by the bypass operation may be compared to the analyzed data generated by the analytics workflow to determine the accuracy of the similarity analysis.

Although the flowchart of FIG. 9 shows a specific order of performance of certain functionalities, method 800 is not limited to that order. For example, toe functionalities shown in succession in the flowchart may be performed in a different order, may be executed concurrently or with partial concurrence, or a combination thereof. In some examples, functionalities described herein in relation to FIG. 9 may be provided In combination with functionalities described herein in relation to any of FIGS. 1-8, and 10, FIG. 10 is a flowchart of an example method 1000 for analytics workflow including performing a similarity analysis and based (at least in part) on a determination of dissimilarity, storing insights data as stored insights data, identifying a threshold for the stored insights data, and executing a remainder of the analytics workflow. Although execution of method 1000 is described below with reference to device 200 of FIG. 2, other suitable systems for the execution of method 1000 can be utilized (e.g., device 100 of FIG. 1). Additionally, Implementation of method 1000 is not limited to such examples.

Figure 10:
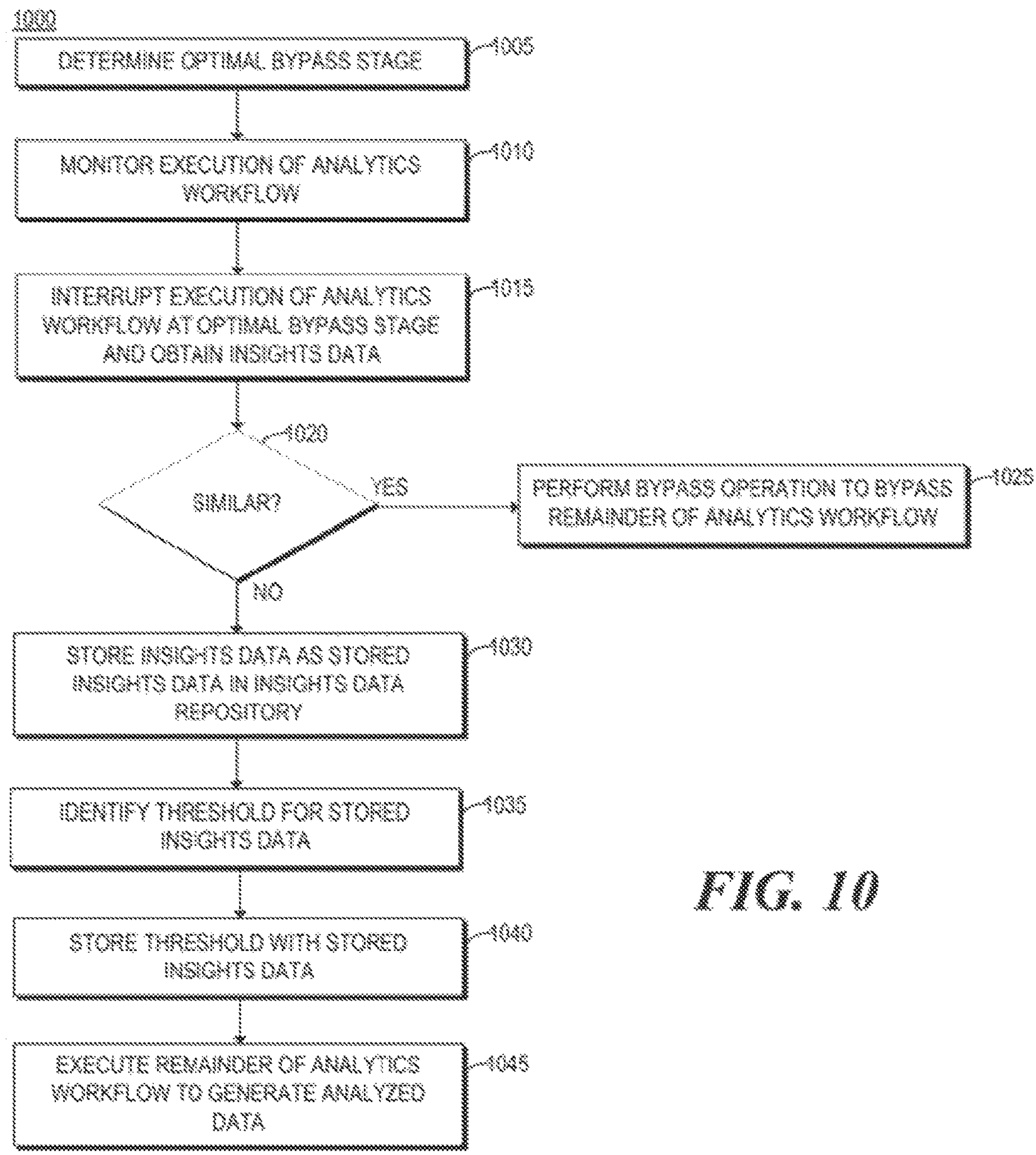
FIG. 10 a flowchart of an example method for analytics workflow including determining an optimal bypass stage, performing a similarity analysis, and bypassing or executing remainder of the analytics workflow based on the similarity analysis.

In the example of FIG. 10, method 1000 may be a method of device 200. At 1005, instructions 230 may determine an optimal bypass stage of an analytics workflow, as described above in relation to FIG. 2, In some examples, the optimal bypass stage may be determined by computing a time savings associated with bypassing the analytics workflow at a stage of the analytics workflow, as described above in relation to instructions 332 of FIG. 3. The time cost associated with performing a similarity analysis at the stage may also be computed, as described above in relation to instructions 334 of FIG. 3. The optimal bypass stage may be determined by maximizing a differential between the time savings and the time cost, as described above in relation to instructions 336 of FIG. 3.

At 1010, instructions 240 may monitor execution of the analytics workflow upon receipt of raw data. This monitoring may be performed as described above in relation to instructions 240 of FIG. 2, In some examples, instructions 240 may monitor the execution of the analytics workflow via tags that associate data within the analytics workflow with the execution of a particular stage of the workflow. In other examples, instructions 240 may monitor execution of the analytics workflow via a workflow execution log.

In some examples, instructions 240 may determine when raw data has been received at the analytics workflow by reviewing tags associated with data in the analytics workflow and/or by reviewing the workflow execution log. Instructions 240 may also determine when raw data has been received at the analytics workflow and begin monitoring execution of the analytics workflow by monitoring a data collection or data gathering mechanism.

At 1015, instructions 250 may interrupt the execution of the analytics workflow at the optimal bypass stage and obtain insights data from the raw data, as described above in relation to instructions 250 of FIG. 2. At 1020, instructions 260 may perform a similarity analysis to compare the insights data to a stored insights data in an insights data repository. This similarity analysis may be performed as described above in relation to instructions 260 of FIG. 2 and as described above in relation to FIG. 4. Based (at least in part) on a determination of similarity, method 1000 may proceed to 1025. At 1025, Instructions 270 may perform a bypass operation to bypass a remainder of the analytics workflow. This bypass operation may be performed as described above In relation to instructions 270 of FIG. 2 and as described above in relation to FIG. 5.

Based (at least in part) on a determination of dissimilarity, method 1000 may proceed to 1030. At 1030, instructions 280 may store the insights data as stored Insights data in the insights data repository, as described above in relation to FIG. 2, In storing the insights data as stored insights data, a threshold may be identified for the stored insights data at 1035, as described above in relation to instructions 682 of FIG. 6. The threshold may be stored with the stored insights data in the insights data repository at 1040, as described above in relation to instructions 684 of FIG. 6. Based (at least in part) on the determination of dissimilarity, at 1045, instructions 290 may execute the remainder of the analytics workflow to generate analyzed data, as described above in relation to FIG. 2.

In some examples, method 1000 may further Involve storing or removing intermediate data, i.e., a data output from an ETL operation. In other examples, method 1000 may be executed at an application framework, in some such examples, the intermediate data may be removed alter the output data has been prepared and stored or after the analyzed data has been generated and stored.

In some examples, method 1000 may be executed in an application framework. In other examples, method 1000 may be executed within storage. Performing the similarity analysts and bypass operation in storage may allow for seamless extraction of stored insights data, previously generated analyzed data, and other stored data, may allow for fewer I/O operations, and may expedite the similarity analysis and bypass operation.

Method 1000 may also involve checking the accuracy of the similarity analysis, in some instances when the insights data has been determined to be similar to a stored insights data, the remainder of the analytics workflow may still be executed. The output data generated by the bypass operation may be compared to the analyzed data generated by the analytics workflow to determine the accuracy of the similarity analysis.

Although the flowchart of FIG. 10 shows a specific order of performance of certain functionalities, method 1000 is not limited to that order. For example, the functionalities shown in succession in the flowchart may be performed in a different order, may be executed concurrently or with partial concurrence, or a combination thereof. In some examples, functionalities described herein in relation to FIG. 10 may be provided in combination with functionalities described herein in relation to any of FIGS. 1-9.

What is claimed is:

1. A device comprising:

a processor; and a non-transitory machine-readable storage medium encoded with instructions, which, when executed by the processor, causes the processor to:

determine an optimal bypass stage from a plurality of stages of an analytics workflow for the device by analyzing the processing power used at each stage of the plurality of stages of the analytics workflow, wherein the optimal bypass refers to a stage of the analytics workflow at which a remainder of the analytics workflow is bypassed;

monitor execution of the analytics workflow upon receipt of a raw data;

interrupt the execution of the analytics workflow at the optimal bypass stage and obtain insights data from the raw data;

perform a similarity analysis to compare the insights data to a stored insights data in an insights data repository; and based on a determination of similarity, perform a bypass operation to bypass the remainder of the analytics workflow, wherein the remainder of the analytics workflow comprises one or more stages of the plurality of stages to be executed after the optimal bypass stage.

2. The device of claim 1, wherein the instructions further cause the processor to:

based on a determination of dissimilarity, store the insights data as stored insights data in the insights data repository, and execute the remainder of the analytics workflow to generate analyzed data.

3. The device of claim 2, wherein the instructions further cause the processor to:

identify a threshold for the stored insights data; and store the threshold with the stored insights data, wherein each stored insights data in the insights data repository has an associated threshold.

4. The device of claim 1, wherein the instructions further cause the processor to:

compute a time savings associated with bypassing the analytics workflow at a stage of the analytics workflow;

compute a time cost associated with performing the similarity analysis at the stage; and maximize a differential between the time savings and the time cost.

5. The device of claim 1, wherein the instructions further cause the processor to:

determine a type of the insights data; and based on the insights data type, perform a data reduction on the insights data, and identify a similarity algorithm.

6. The device of claim 1, wherein the instructions further cause the processor to:

prepare an output data associated with the raw data based on a previously generated analyzed data associated with the stored insights data.

7. The device of claim 1, wherein the similarity analysis and the bypass operation occur at one of a storage layer and an application framework.

8. The device of claim 1, wherein performing the bypass operation comprises:

skipping the remainder bypass the remainder of the analytics workflow.

9. The device of claim 1, wherein performing the bypass operation comprises:

terminating the execution of the analytics workflow.

10. The device of claim 1, wherein performing the bypass operation comprises:

tagging that the execution of the analytics workflow has been completed.

11. The device of claim 1, wherein determining the optimal bypass stage comprises:

comparing processing power used to complete a similarity analysis at each stage of the plurality of stages against processing power to complete the analytics workflow from each stage of the plurality of stages.

12. The device of claim 1, wherein determining the optimal bypass stage comprises:

analyzing a number of input/output (I/O) operations to be performed at each stage of the plurality of stages.

13. A non-transitory machine-readable storage medium encoded with instructions, which, when executed by a processor, cause the processor to:

monitor execution of an analytics workflow upon receipt of a raw data, wherein the analytics workflow comprises a plurality of stages;

interrupt the execution of the analytics workflow at an optimal bypass stage of the plurality of stages and obtain insights data from the raw data, wherein the optimal bypass stage is based on the processing power used at each stage of the analytics workflow, wherein the optimal bypass refers to a stage of the analytics workflow at which a remainder of the analytics workflow is bypassed;

perform a similarity analysis to compare the insights data to a stored insights data in an insights data repository;

based on a determination of similarity, perform a bypass operation to bypass the remainder of the analytics workflow, wherein the remainder of the analytics workflow comprises one or more stages of the plurality of stages to be executed after the optimal bypass stage; and based on a determination of dissimilarity, store the insights data as stored insights data in the insights data repository, and execute the remainder of the analytics workflow to generate analyzed data.

14. The non-transitory machine-readable storage medium of claim 13, wherein the instructions further cause the processor to:

determine the optimal bypass stage of the analytics workflow by maximizing a differential between a time savings and a time cost, wherein the time savings is associated with bypassing the analytics workflow at a stage of the analytics workflow and the time cost is associated with performing the similarity analysis at the stage.

15. The non-transitory machine-readable storage medium of claim 13, wherein the instructions further cause the processor to:

prepare an output data associated with the raw data based on a previously generated analyzed data associated with the stored insights data; and remove the raw data.

16. A method for analytics workflow, comprising:

monitoring execution of the analytics workflow upon receipt of a raw data, wherein the analytics workflow comprises a plurality of stages;

interrupting the execution of the analytics workflow at an optimal bypass stage of the plurality of stages and obtaining insights data from the raw data, wherein the optimal bypass stage is based on the processing power used at each stage of the analytics workflow, wherein the optimal bypass refers to a stage of the analytics workflow at which a remainder of the analytics workflow is bypassed;

performing a similarity analysis to compare the insights data to a stored insights data in an insights data repository;

based on a determination of similarity, performing a bypass operation to bypass the remainder of the analytics workflow, wherein the remainder of the analytics workflow comprises one or more stages of the plurality of stages to be executed after the optimal bypass stage; and based on a determination of dissimilarity, storing the insights data as stored insights data in the insights data repository, identifying a threshold for the stored insights data, storing the threshold with the stored insights data, wherein each stored insights data in the insights data repository has an associated threshold, and executing the remainder of the analytics workflow to generate analyzed data.

17. The method of claim 16, wherein determining an optimal bypass stage of the analytics workflow further comprises:

computing a time savings associated with bypassing the analytics workflow at a stage of the analytics workflow;

computing a time cost associated with performing the similarity analysis at the stage; and maximizing a differential between the time savings and the time cost.

18. The method of claim 16, wherein performing the similarity analysis further comprises:

determining a type of insights data; and based on the insights data type, performing a data reduction on the insights data, and identifying a similarity algorithm.

19. The method of claim 16, wherein performing the bypass operation further comprises:

preparing an output data associated with the raw data based on a previously generated analyzed data associated with the stored insights data; and removing the raw data.

20. The method of claim 19, wherein performing the bypass operation further comprises:

removing an intermediate data after preparing the output data.

* * * * *